W. W. TALBOT & C. A. SAWTELLE.
COMBINED BUFFER AND FENDER.
APPLICATION FILED NOV. 6, 1911.
1,111,771.
Patented Sept. 29, 1914.
5 SHEETS—SHEET 1.
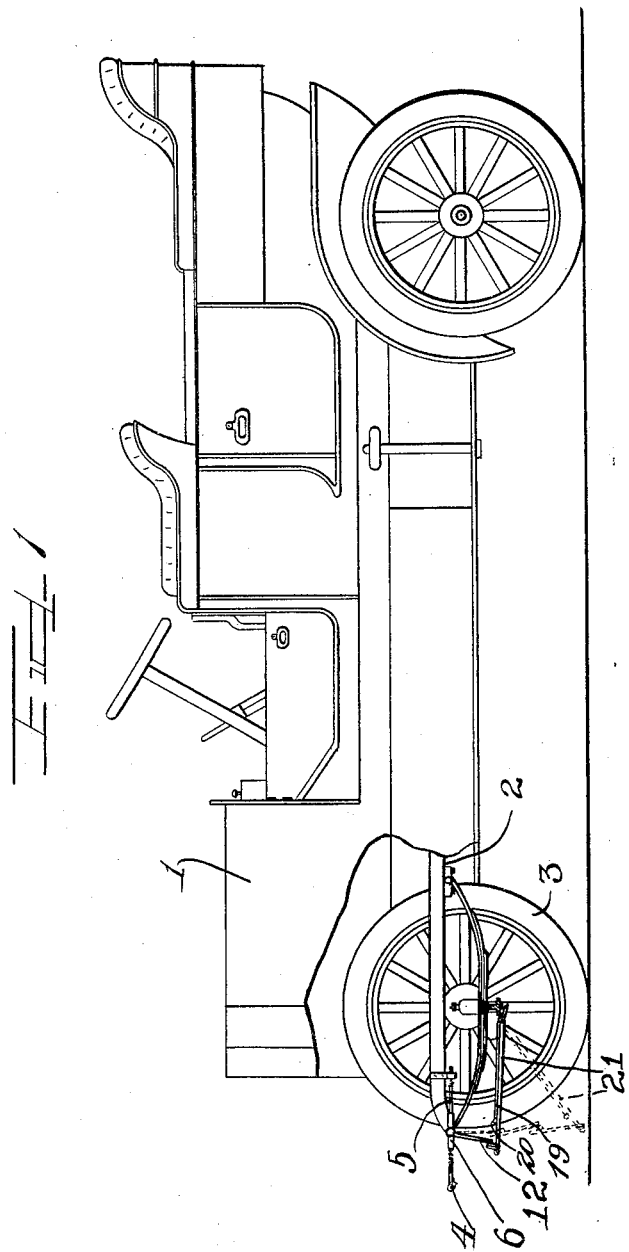

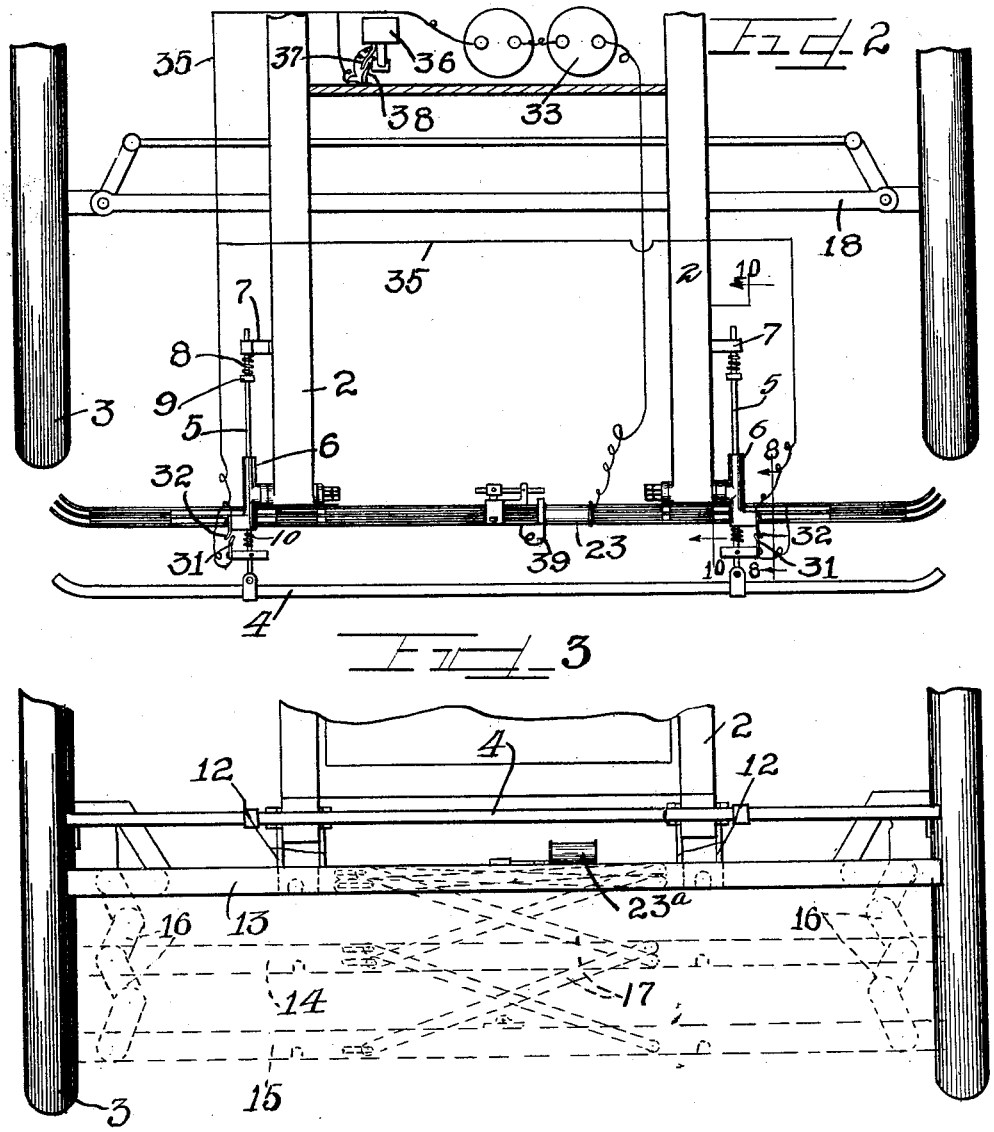

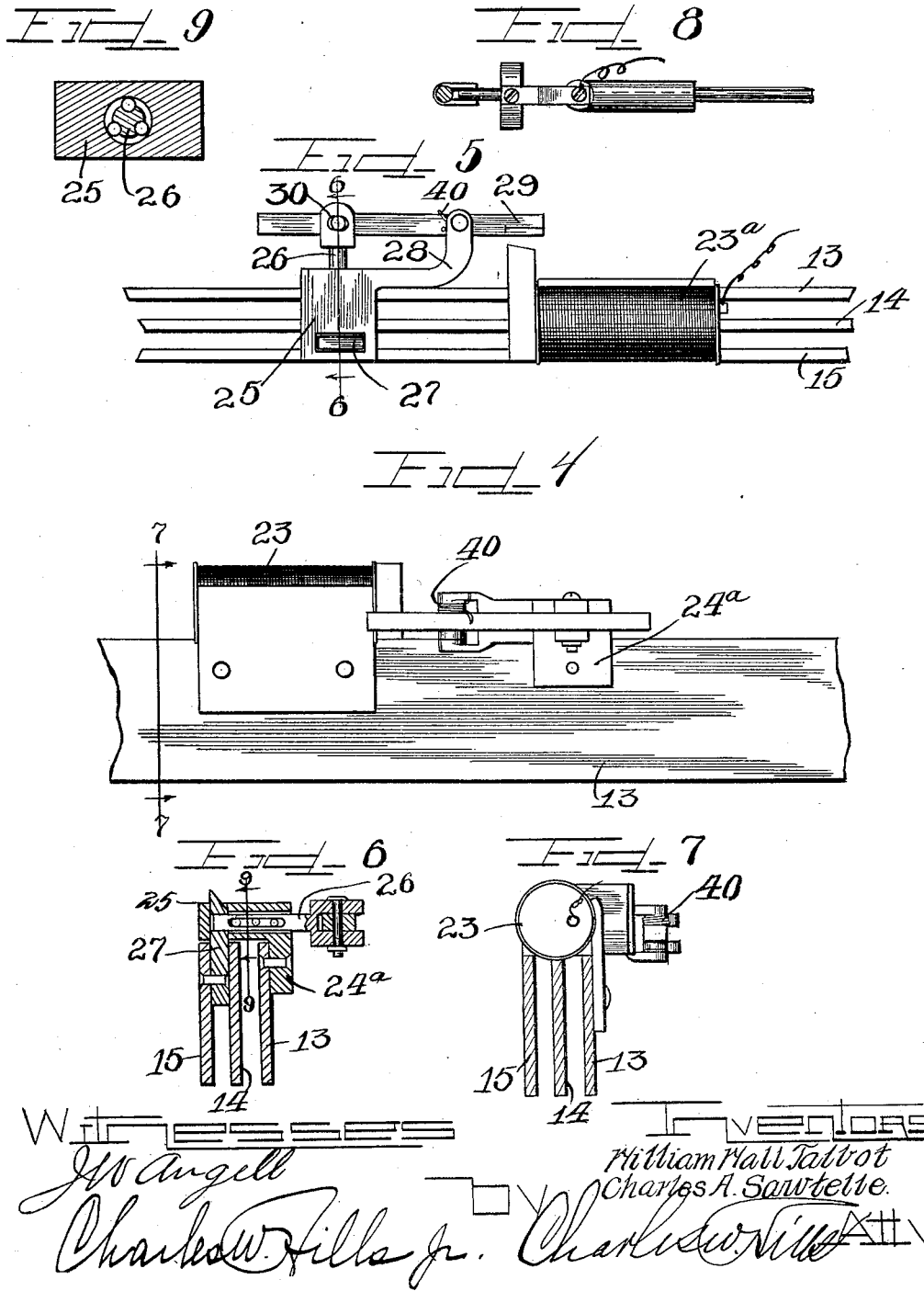

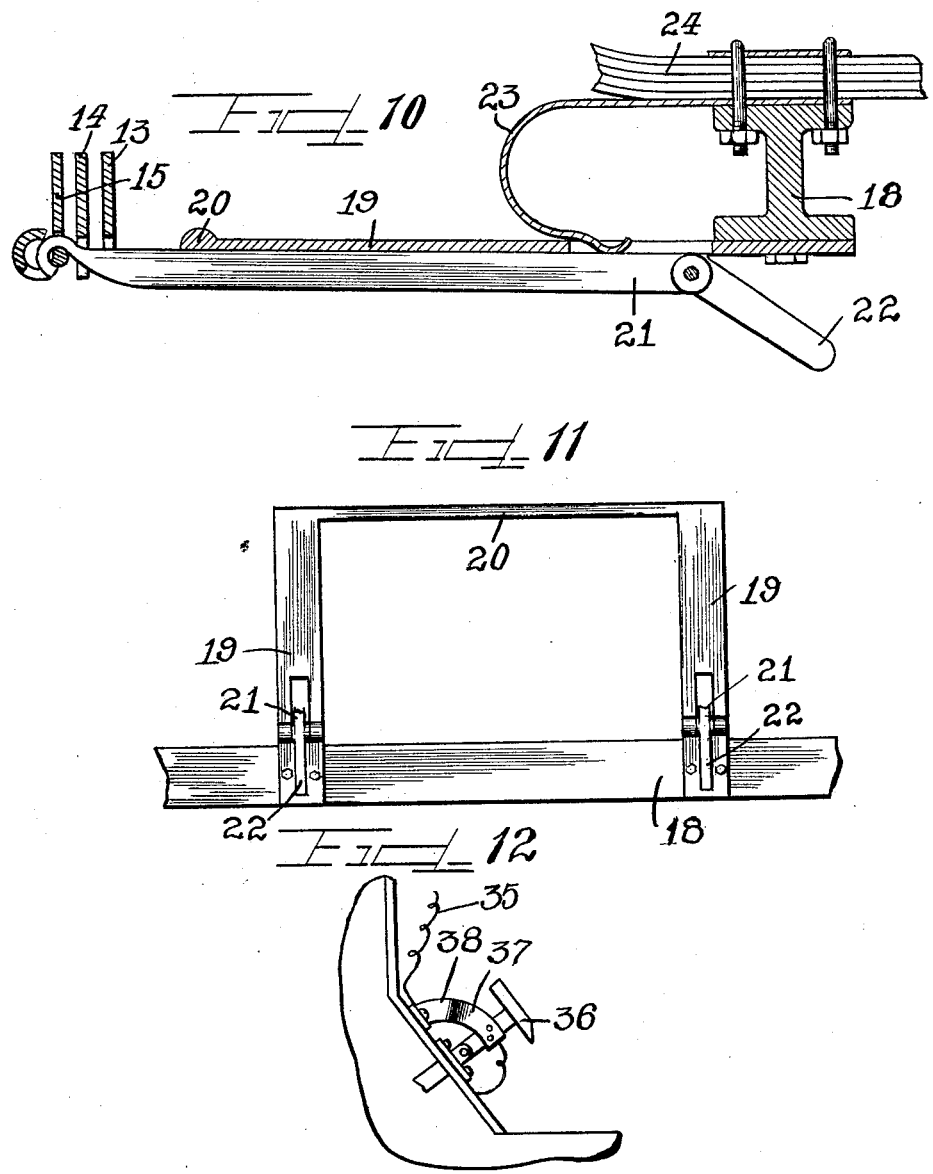

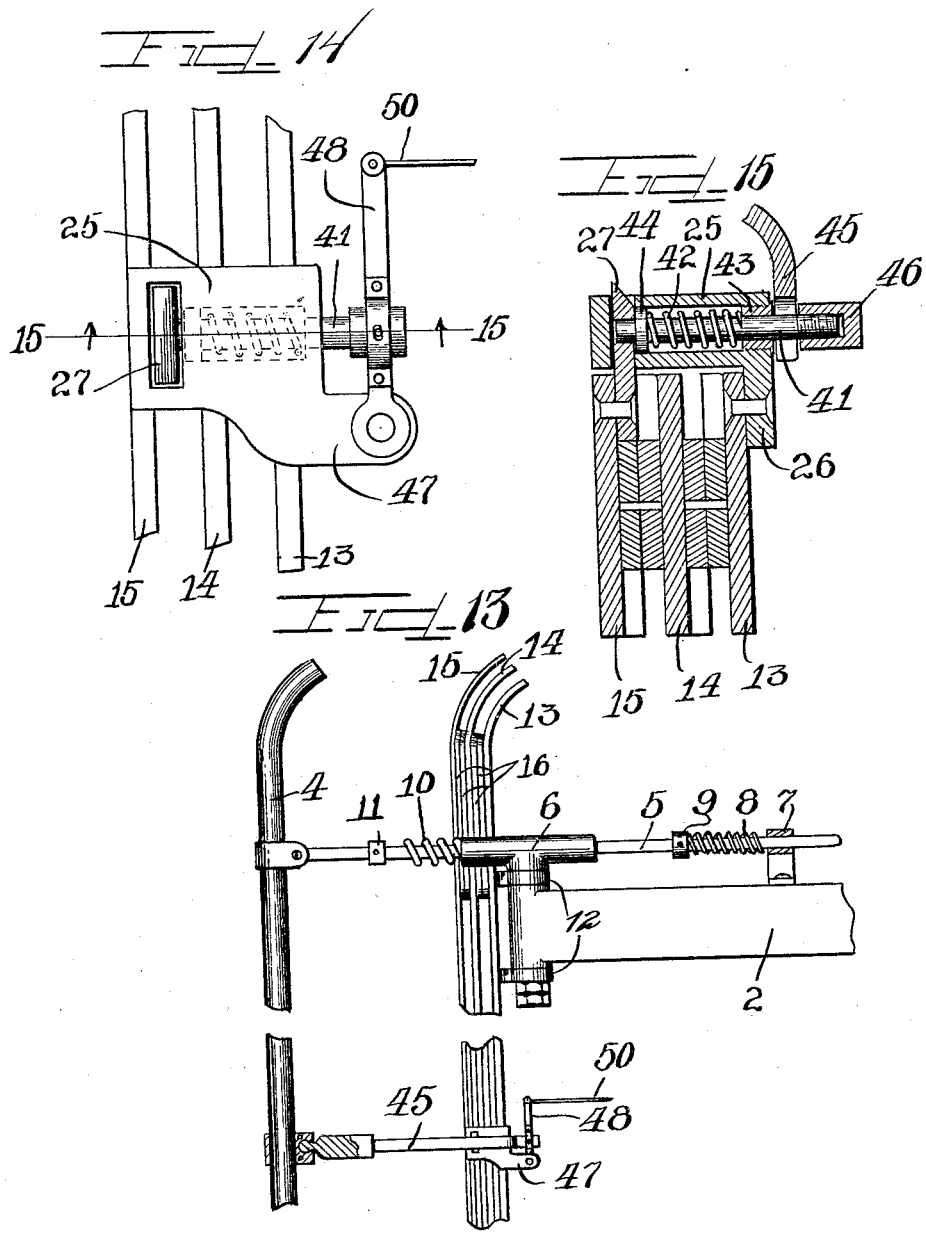

UNITED STATES PATENT OFFICE.

WILLIAM WALL TALBOT, OF CHICAGO, ILLINOIS, AND CHARLES A. SAWTELLE, OF SALT LAKE CITY, UTAH, ASSIGNORS, BY DIRECT AND MESNE ASSIGNMENTS, OF ONE-HALF TO SIDNEY H. BOYNTON, OF CHICAGO, ILLINOIS, AND ONE-HALF TO JAMES H. DOW, OF ATLANTA, GEORGIA.

COMBINED BUFFER AND FENDER.

1,111,771.  Specification of Letters Patent.  Patented Sept. 29, 1914.

Application filed November 6, 1911. Serial No. 658,628.

*To all whom it may concern:*

Be it known that we, WILLIAM WALL TALBOT and CHARLES A. SAWTELLE, citizens of the United States, and residents of the city of Chicago, county of Cook, and State of Illinois, and Salt Lake City, in the county of Salt Lake and State of Utah, respectively, have invented certain new and useful Improvements in Combined Buffers and Fenders; and we do hereby declare that the following is a full, clear, and exact description of the same, reference being had to the accompanying drawings, and to the numbers of reference marked thereon, which form a part of this specification.

The use of buffers as heretofore installed on automobiles, has been mainly for the protection of the lamps and front of the machine, the purpose being to absorb the shock occasioned by the automobile striking an object and to thereby reduce the impact as much as possible, and consequent injury. Such buffers, as heretofore installed, have been of very slight (if any) value, in protecting pedestrians and others from injury in the case of being struck by a moving automobile, inasmuch as the buffer as usually installed, is of such height as to serve to merely knock the victim down, permitting the car to pass over him. Such accidents, many of them resulting fatally, are very common.

The object of this invention is to afford a combined buffer and fender, so constructed as to prevent a victim of such a collision from passing beneath the wheels.

It is also an object of the invention to afford a construction in which the fender is normally supported in raised retracted position, and to afford means for releasing and for moving the same to extended position simultaneously with the shock upon the buffer.

It is also an object of the invention to afford a construction by means of which the operator may throw the fender into extended position from the chauffeur's seat.

Other objects of the invention, and the scope of the invention, will be more fully understood from the drawings and specification and claims appended thereto.

In the drawings (illustrating a preferred form of our invention):—Figure 1 is a side elevation, partly broken away, of an automobile equipped with a device embodying our invention. Fig. 2 is an enlarged, fragmentary, top plan view with parts omitted. Fig. 3 is an enlarged, fragmentary, front elevation of the device in normal position, the dotted lines indicating the same when extended for use. Fig. 4 is an enlarged, fragmentary detail of a part of the supporting and releasing means of the fender. Fig. 5 is a fragmentary, top plan view of the same. Fig. 6 is a right vertical section on line 6—6 of Fig. 5. Fig. 7 is a right vertical section with parts omitted, on line 7—7 of Fig. 4. Fig. 8 is an enlarged, fragmentary right vertical section taken on line 8—8 of Fig. 2, with parts omitted. Fig. 9 is an enlarged right vertical section on line 9—9 of Fig. 6. Fig. 10 is an enlarged, fragmentary detail right vertical section on line 10—10 of Fig. 2, with parts omitted. Fig. 11 is an enlarged bottom plan view of the holding frame. Fig. 12 is a fragmentary detail, illustrating the dash control of the fender. Fig. 13 is a fragmentary, top plan view of a slightly modified arrangement of the supporting and releasing means for the fender. Fig. 14 is an enlarged, fragmentary detail of the supporting and releasing means illustrated in Fig. 13, and Fig. 15 is a right vertical section taken on line 15—15 of Fig. 14.

As shown in the drawings: 1, indicates an automobile of any construction; 2, the side frame members or sills of the chassis; 3, the front wheels, and 4, the buffer of the usual or any preferred type. As shown, said buffer comprises a metallic bar extending transversely of the car beyond the front wheels, and of a length approximately equal to the distance between the tread surfaces of the front wheels, and, as shown, is curved rearwardly at its extremities. Said buffer is supported, as usual, upon rods 5, each slidably supported in a tubular bracket 6, of the usual or any preferred form, supported one at the outer side of each of the side frame members at its forward extremity, as shown in Figs. 1, 2 and 13. Each of said supporting rods, as shown, also extends through a bracket 7, secured on the side frame member 2, at the rear of the bracket 6, and a relatively weak spring 8, bears against said bracket 7, and against a collar 9, on said rod 5, for the purpose of absorbing the lesser shocks to which the buffer bar may be subjected. Secured on said rod, and bearing against the forward end of the tubular bracket 6, is a strong cushioning spring 10, adapted to be brought into bearing against a collar or block 11, secured on said rod 5, after the resistance of the lighter spring 8, has been overcome, and to absorb greater stresses. Depending also from the front ends of each of the side frame members 2, are metallic straps 12, which, as shown, are supported upon the same pintles or bolts as the tubular brackets 6. Said metallic straps support the fender. This, as shown, comprises a plurality of bars 13, 14 and 15, of a length and curved at the extremities to correspond with the buffer bar 4, and connected together near their ends by means of toggle bars 16, and at the middle by means of toggle bars 17, arranged as lazy tong levers, and shown in dotted lines in Fig. 3, whereby the fender bars 14 and 15 are adapted to be supported when the fender is extended upon the fender bar 13, with the lower bar 15 thereof in close proximity, but out of contact, with the ground. The upper fender bar 13 is supported in any suitable manner upon the links or straps 12.

Bolted or otherwise rigidly secured to the front axle 18 is a horizontally and forwardly extending frame, comprising parallel forwardly extending bars 19, and a transverse bar 20, at the forward ends thereof, which lies in close proximity to the upper fender bar 13, as shown in dotted lines in Fig. 1, when the fender is extended. Hinged on the under side thereof near the axle, as shown more fully in Figs. 1, 10 and 11, are two levers, one arm 21 of each of which extends forwardly beyond said frame and is provided with a hook at its extremity, which extends through an aperture in the outer fender bar 15, as shown in Fig. 10.

As shown, each of the fender bars 13 and 14 are notched on the under side to fit over each of said lever arms 21, near the extremity thereof, and the lower edge of the fender bar 15 is rolled or beaded upwardly to reinforce said fender bar at the lower edge thereof, and bearing against said hook, confines the latter to its engagement upon said fender bar. The rear end 22 of said lever extends rearwardly and obliquely downward, as shown in Fig. 10, to serve as a stop for said lever when the arm 21 is swung downwardly, and to insure the lower fender bar supported upon the forward end of said lever being held out of contact with the ground. A strong pushing spring 23, shown as a curved leaf spring, is engaged on the axle between the body suspension spring 24, and said axle, and the free ends thereof extend through a slot in each of the arms 19 of said frame, and bear upon said lever end 21, to assist in throwing the same, and the fender, downwardly.

Means are provided for normally supporting said fender in its closed or elevated position, and for releasing the same when occasion may require. The release may be effected either automatically or by the operator, and in Figs. 2, and 4 to 9 inclusive, we have illustrated an electro-magnetic control thereof. For this purpose, as shown, an electro-magnet 23$^a$, is supported centrally on the upper fender bar 13, near the middle thereof.

A forwardly extending bracket 24$^a$ is also secured on said fender bar 13, and is provided at its upper end with an integral forwardly and horizontally projecting extension 25, apertured to receive a horizontally slidable locking bolt 26, therethrough, as shown in Figs. 5 and 6, and, as shown, rigidly secured on the lower fender bar 15, is an upwardly extending apertured bolt 27, positioned to extend through a vertical aperture near the front edge of said bracket 25, into position for the locking bolt 26, to engage therethrough, as shown in Fig. 6. An arm 28, integral with said bracket, extends laterally toward the electro-magnet, and rearwardly, and pivotally engaged thereon is a bar 29, one end of which extends through the head of the locking bolt 26, and is provided with a slotted aperture to receive a pintle 30, therethrough. The other end of said bar extends in close proximity with the pole of said electro-magnet and serves as the armature therefor, so that, when the electro-magnet is energized, said armature bar 29, is actuated to release the bolts to permit the extension of the fender.

Secured on the buffer supporting rod 5, is a spring contact member 31, and supported on the tubular bracket 6, at each side of the machine and insulated therefrom, is a complemental spring contact member 32, said contact members being normally held out of engagement by the tension of the buffer springs. A battery or other source of electric current 33, is carried at any convenient point upon the car, for example, the ordinary sparking device may suffice, and one lead 34, from said battery is connected with one of the lead wires for the electromagnet and the other lead wire 35, from said battery is connected with both of the contact members 32, before described, which are insulated from metallic contact with any portion of the frame.

Conveniently positioned with reference to the chauffeur is a foot pedal 36, provided with a spring contact member 37, grounded to the frame, and adapted to contact a complemental spring contact member 38, which is electrically connected with the lead wire 35, before described. One of the lead wires 39, of the electro-magnet is also grounded to the frame, as shown in Fig. 2.

The operation is as follows: The electro-magnetic circuit is normally broken. Should the buffer bar, however, be brought in contact with any object with sufficient force to compress the springs, the circuit is closed through the contact members 31 and 32, at each side of the machine, and the electro-magnet is thereby energized, instantly releasing the bolt, and thereby the fender. Said fender, of course, would fall by gravity, but the fall is hastened by the action of the springs 23, which throw the fender down very quickly, bringing the fender to the position shown in dotted lines Fig. 1, almost instantly, in which position the bottom rail of the fender is supported from rearward movement by the lever arm and the upper bar of the fender is supported against the frame bar 20. Furthermore, the fender, as it descends, moves slightly rearwardly at its lower edge, thus preventing any tendency whatever for the fender to fall over or beyond the object struck. It may, of course, occur, that the operator, seeing an accident to be imminent, may throw the fender down preparatory to such. In this case the foot pedal 36, is actuated, bringing the contact members 37, and 38, into engagement, and completing the electro-magnetic circuit, as before described, and with the same result. Of course, with the descent of the fender, and the release of pressure upon the foot pedal or upon the buffer bar, the circuit is again broken.

When it is desired to restore the fender to normal position, it is only necessary to raise the fender, whereupon the bolt 27, (which is inclined at its upper edge on the rear side thereof), engages to retract the bolt 26, to prevent the bolts again engaging, as shown in Fig. 6, and for this purpose and to hold the bolts normally engaged a coiled tension spring 40, is secured on the pintle for the armature bar or lever, and acts to hold said bolts normally in engagement, notwithstanding any vibration due to the operation of the machine. Of course, it is not essential that electro-magnetic means be employed to release the fender. In the construction shown in Figs. 13 to 15 inclusive, the locking bolt 41, extends slidably through the head 25, of the bracket, whereby the fender is supported, the bore in the head of said bracket being sufficiently large to contain also a coiled pushing spring 42, coiled about said bolt, one end of which engages against a stop 43, screwed into the rear end of said bore, the other end of which bears against a collar 44, on the forward end of the bolt. As shown also, a pushing bar 45, is secured at its forward end at the middle of the buffer bar and extends rearwardly over said bracket and its downwardly turned slotted or yoked end engages said bolt 41, as shown in Figs. 13 and 15. Secured on the rear end of said bolt is an enlarged head or collar 46, and pivotally engaged at one end on an arm 47, on said bracket, is a lever 48, which engages said head 46, in any suitable manner to actuate the same, and at the free end of which is a rod or cable 50, which leads rearwardly to any point convenient for the chauffeur. In this construction, obviously, should the buffer strike any object, the shock would retract the bolts and permit the fender instantly to descend. Should the operator desire to release the fender, it is only necessary to pull upon the rod or line 50, to retract the bolt with the same result.

Of course, numerous other connections to afford an automatic, and also manually operated releasing means for the fender, may be employed, any of which may answer the purpose, and it is to be understood that we have shown but a preferred construction of our invention as a whole. We therefore do not purpose limiting ourselves otherwise than necessitated by the prior art, and we purpose claiming broadly any construction for the purpose specified, whereby a normally concealed and supported fender is adapted to be projected downwardly, either automatically or manually, to preclude the vehicle passing over a person struck thereby.

We claim as our invention:

1. An automobile fender of the class described comprising a plurality of articulated members adapted to be extended, releasable means affording support for one of said members, and levers pivoted to the automobile and to said releasably supported member, said levers acting to support said articulated members other than the releasably supported member when the fender is in retracted position.

2. A foldable automobile fender, comprising a plurality of bars, means for releasably locking said bars in retracted position, a yieldingly supported bumper, means for releasing said locking means when pressure is applied to said bumper, and a common means for throwing said bars to extended position and for limiting said movement.

3. A foldable automobile fender, comprising hingedly supported articulated members, levers engaging said members when in retracted position, means for releasably locking said members in retracted position, and means for automatically releasing said locking means, said levers acting to throw said members to extended position and to limit their extending movement.

4. A collapsible automobile fender of the class described, embracing hingedly supported articulated members, levers engaging said members when in retracted position, means for releasably locking said members in retracted position, and means for automatically releasing said locking means, said levers acting to throw said members to extended position to limit said extending movement and to brace the same in such position.

5. A device of the class described embracing an extensible automobile fender composed of normally collapsed articulated bars, a lock on one of said bars for locking the same, a yieldingly supported member in advance of the fender and acting with impact to actuate the lock to release the fender, springs acting to actuate a plurality of levers, said levers being pivotally engaged at a fixed point of support and engaged at the bottom of the fender and acting to swing said fender downwardly and rearwardly when extended, and to support and limit the extending movement of the same at the lowest edge thereof, and operative connections adapted for manual actuation to release and extend the fender at the will of the operator.

6. A foldable automobile fender embracing a plurality of parallel bars, one in front of the other in the retracted position, toggle bars connecting the same and adapted to permit said bars to fall in parallel relation, a lock supporting one of said bars transversely of the car at the front end of the frame thereof, spring pressed levers engaged on the bottom bar of said fender and acting to throw the same downwardly and rearwardly when the lock is released, automatic means for releasing the lock, and means controlled by the operator for releasing the latch, in each instance permitting the fender to move to extended position.

7. A foldable automobile fender, comprising a relatively stationary bar, a plurality of bars movable parallel thereto, a slidable bolt secured on said first mentioned bar, an apertured lug on another of said bars adapted to be engaged by said bolt, and a plurality of arms attached to said lug bar and adapted to limit the extensible movement of said movable bars.

8. A foldable fender of the class described consisting of an inner fixed member, an outer movable member horizontally superposed thereover and connected thereto, a plurality of intermediate members connected to each other, means for locking said inner and outer members together, and a plurality of arms attached to said outer movable member adapted to limit the projection thereof.

9. A foldable automobile fender, comprising a plurality of articulated bars adapted to be extended, means for releasably locking said bars in retracted position, and levers pivoted to the automobile and acting to limit the projecting movement of said bars and to brace the same when projected.

10. A foldable automobile fender, comprising a plurality of articulated bars adapted to be extended, means for releasably locking said bars in retracted position, and spring pressed levers pivoted to the automobile and acting to project said bars, to limit their projection and to brace them when projected.

In testimony whereof we have hereunto subscribed our names in the presence of two subscribing witnesses.

WILLIAM WALL TALBOT.
CHARLES A. SAWTELLE.

Witnesses:
CHARLES W. HILLS, Jr.,
GEORGE R. MOORE.

---

Copies of this patent may be obtained for five cents each, by addressing the "Commissioner of Patents, Washington, D. C."